United States Patent
Yoshida et al.

(10) Patent No.: US 7,492,250 B2
(45) Date of Patent: Feb. 17, 2009

(54) POWER-SAVING ON-VEHICLE CONTROLLER

(75) Inventors: Koji Yoshida, Obu (JP); Akinori Komura, Okazaki (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 11/976,504

(22) Filed: Oct. 25, 2007

(65) Prior Publication Data

US 2008/0061964 A1 Mar. 13, 2008

Related U.S. Application Data

(62) Division of application No. 11/153,385, filed on Jun. 16, 2005, now Pat. No. 7,394,350.

(30) Foreign Application Priority Data

Jul. 23, 2004 (JP) ............... 2004-215972

(51) Int. Cl.
G08B 1/08 (2006.01)
(52) U.S. Cl. ............... 340/539.19; 340/539.1; 340/539.3; 340/541; 340/825.69; 340/825.72; 340/10.1; 340/10.3; 307/10.2; 307/10.3
(58) Field of Classification Search ............ 340/539.19, 340/539.1, 539.3, 426.11, 426.13, 825.69, 340/825.72, 10.1, 10.3, 541; 307/10.2, 10.3, 307/10.6, 10.7; 342/42
See application file for complete search history.

(56) References Cited

U.S. PATENT DOCUMENTS

| | | | |
|---|---|---|---|
| 5,654,686 A * | 8/1997 | Geschke et al. | ........ 340/426.26 |
| 5,982,292 A | 11/1999 | Tagawa et al. | |
| 6,043,752 A | 3/2000 | Hisada et al. | |
| 6,420,967 B1 | 7/2002 | Ghabra et al. | |
| 6,670,883 B1 | 12/2003 | Asakura et al. | |
| 7,061,137 B2 | 6/2006 | Flick | |
| 7,109,852 B2 * | 9/2006 | Gupte et al. | ........... 340/426.26 |

FOREIGN PATENT DOCUMENTS

JP  A-2000-170420  6/2000

* cited by examiner

Primary Examiner—Hung T. Nguyen
(74) Attorney, Agent, or Firm—Posz Law Group, PLC

(57) ABSTRACT

An on-vehicle controller performs smart control for transmitting a transmission request signal to a predetermined area and for unlocking a door of a vehicle based on a return signal transmitted by a portable device receiving the transmission request signal, security control for providing a warning if improper conduct to the vehicle is detected, remote keyless entry control for locking or unlocking the door according to a manual operation signal, which is transmitted from the portable device according to button manipulation thereof, and immobilizer control for permitting an engine start if an identification code transmitted from a transponder of the portable device coincides with an identification code stored in the vehicle. If a mode switch is switched to an off position, the controller is switched to a power-saving mode for performing only the immobilizer control.

2 Claims, 2 Drawing Sheets

POWER-SAVING ON-VEHICLE CONTROLLER

CROSS REFERENCE TO RELATED APPLICATION

This application is a division of application Ser. No. 11/153,385 filed on Jun. 16, 2005, now U.S. Pat. No. 7,394,350 which is based on and incorporates herein by reference Japanese Patent Application No. 2004-215972 filed on Jul. 23, 2004.

BACKGROUND OF THE INVENTION

1. Field of the Invention

The present invention relates to an on-vehicle controller having a smart control function, a security control function and an immobilizer function.

2. Description of Related Art

A known vehicle-mounted controller is programmed to perform a smart control function (smart entry control function) to control the operation of an on-vehicle device. More specifically, the smart control function causes a transmission request signal to be transmitted from an on-vehicle transmitter to a predetermined area. If a portable device such as a smart key receives the transmission request signal, the portable device transmits a return signal. An on-vehicle receiver receives the return signal. If a code included in the return signal coincides with another code stored in the vehicle-mounted controller, the vehicle-mounted controller drives a door lock actuator to unlock a door or permits the door to be unlocked.

A switch for activating and deactivating the smart control function is provided. If the switch is switched to an on or off position, transmission of the transmission request signal from the on-vehicle transmitter is stopped to turn off the smart control function, for instance, as disclosed in JP-A-2000-170420 or JP-A-2001-98810.

The aforementioned vehicle-mounted controller may also be programmed to perform a vehicle immobilizer function such as a burglary prevention function. An identification code (immobilization code) for certifying engine start permission stored in a transponder in the portable device is read through electromagnetic induction radio communication using an antenna coil wound around a key cylinder in the vehicle. Fuel injection and ignition of the engine are permitted so that the engine can start only when the read identification code coincides with an identification code stored in the vehicle-mounted controller.

The aforementioned vehicle-mounted controller may also be programmed to perform a security control function, in which security sensors such as an intrusion sensor, an inclination sensor and an impact sensor are dedicated to detecting improper conduct committed by an outsider to a vehicle. The intrusion sensor detects intrusion of the outsider into a vehicle compartment with the use of a supersonic wave or a radio frequency (RF). The inclination sensor senses inclination of the vehicle. The impact sensor detects an impact applied to the vehicle. The security control function provides a warning with the use of, for example, a siren if an abnormality is detected by the above security sensors.

In recent years, many vehicle-mounted controllers have been designed to include the smart control function, the immobilizer function and the security control function. The smart control function and the security control function operate and consume power even when the vehicle is parked. Accordingly, there is a high possibility that the vehicle battery may die due to power consumption by the above functions, especially when the vehicle is transported over a long distance by ship. Therefore, conventionally, when the vehicle is transported over a long distance, the vehicle battery is disconnected from the vehicle.

If the vehicle battery is disconnected, the engine cannot be started. Therefore, when the vehicle is unloaded from the ship, the battery must be re-connected.

The above problem occurs not only when a vehicle is transported over a long distance but also when the vehicle is not driven for a long time. Therefore, the vehicle battery is often disconnected to conserve battery power. However, even when a vehicle that has not been driven for an extended period of time needs to be driven only a short distance, the disconnected battery must be re-connected before the vehicle can be driven.

The control function disclosed in JP-A-2000-170420 and JP-A-2001-98810 for turning off the smart control function via a switch does not inhibit the power consumption of the security control function. Therefore, the battery must also be disconnected in a vehicle in which a vehicle-mounted controller includes such a control function.

SUMMARY OF THE INVENTION

It is therefore an object of the present invention to provide an on-vehicle controller capable of preventing unnecessary vehicle battery power consumption when the vehicle is transported over a long distance or is not driven for an extended period of time, and of enabling a vehicle to be driven after one of the above scenarios without requiring extra work or manipulation to disconnect and then re-connect the vehicle battery.

According to an aspect of the present invention, an on-vehicle controller is programmed to include smart control, security control and immobilizer control functions, and includes a mode switch. The smart control function causes a transmission request signal to be transmitted from an on-vehicle transmitter to a predetermined area. A return signal, which is transmitted by a portable device receiving the transmission request signal, is then received by an on-vehicle receiver. The smart control function controls an on-vehicle device such as a door lock actuator based on the received return signal. The security control function provides a warning if a security sensor detects improper vehicle contact. The immobilizer control function performs radio communication with the portable device and reads an identification code for certifying engine start permission, which is transmitted from the portable device. The immobilizer control function permits the engine start if the read identification code coincides with a stored identification code.

The mode switch is switched between an on and off positions to switch an operation mode of the on-vehicle controller between a normal mode and a power-saving mode. In the normal mode, the smart control, security control and immobilizer control functions are activated. In the power-saving mode, only the immobilizer control function remains activated. Therefore, the engine start is possible as in the case of the normal mode.

Therefore, when the on-vehicle controller is switched from an operation mode to a power-saving mode when the vehicle is transported over a long distance or is not driven for a long time, power consumed by the smart control function and the security control function can be saved, and vehicle battery depletion can be inhibited. In addition, the engine can operate and the vehicle can run without requiring extra work or manipulation for disconnecting and then re-connecting the vehicle battery.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

Figure 1:
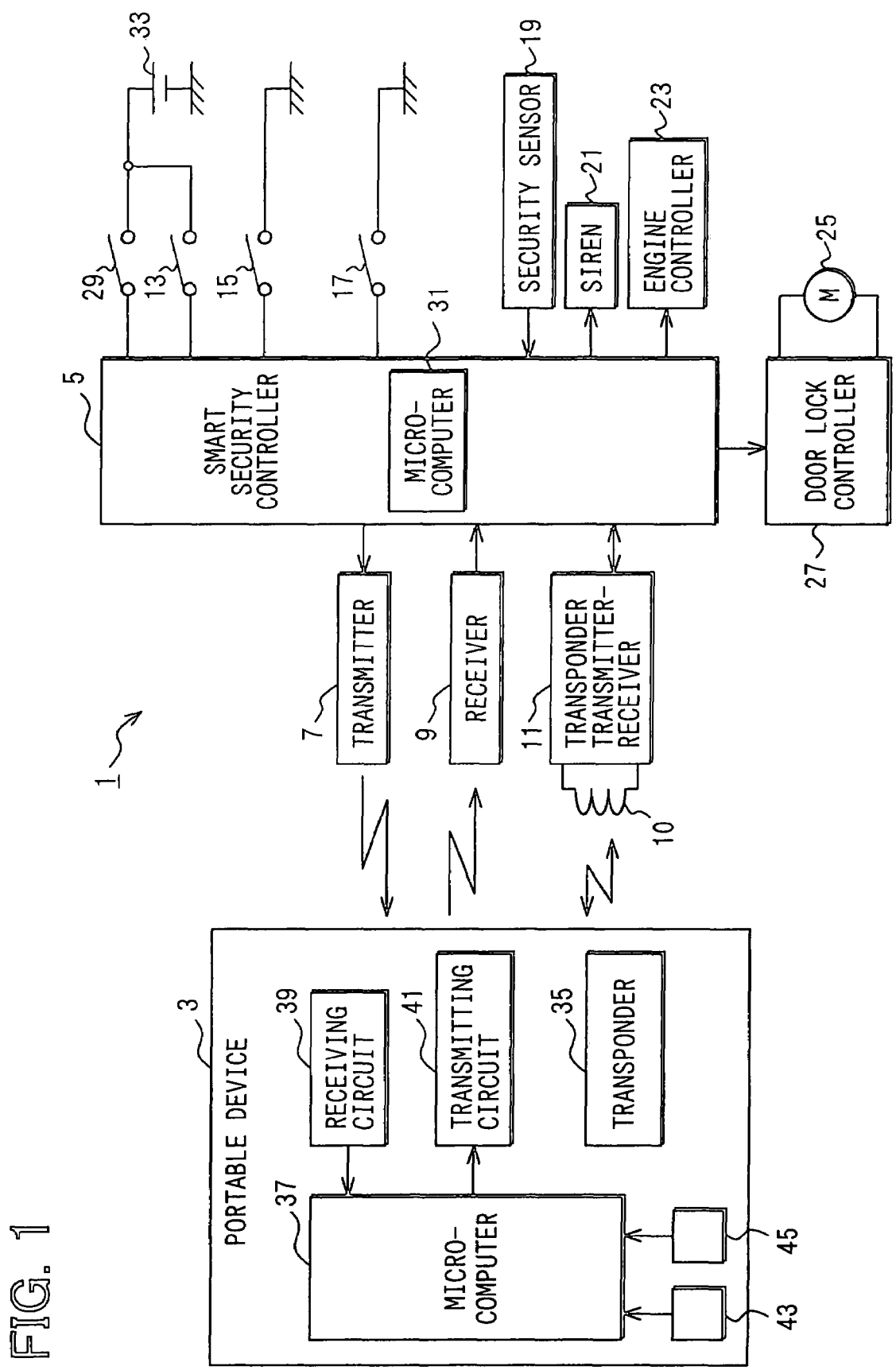
FIG. 1 is a structural diagram showing an electronic key system according to an embodiment of the present invention.

Referring to FIG. 1, a vehicular electronic key system including an on-vehicle controller according to an embodiment of the present invention is illustrated.

As shown in FIG. 1, the electronic key system 1 of the present embodiment includes a portable device 3 and a smart security controller 5. The portable device 3 is an electronic key carried by a vehicle user. The smart security controller 5 is a vehicular controller mounted on the vehicle.

The smart security controller 5 is connected with a transmitter (on-vehicle transmitter) 7, a receiver (on-vehicle receiver) 9, a transponder transmitter-receiver 11, an ignition switch (IGSW) 13 of the vehicle, a door opening detection switch 15, a door lock sensor 17, a security sensor (intrusion detection sensor) 19, a siren (sound warning device) 21, a door lock controller 27 and a mode switch (MDSW) 29. The transmitter 7 transmits a transmission request signal to a predetermined detection area outside the vehicle. The receiver 9 receives a radio signal transmitted from the portable device 3. The transponder transmitter-receiver 11 performs electromagnetic induction radio communication with the portable device 3. The door opening detection switch 15 senses an opening-closing state of the door. The door lock sensor 17 senses a locked-unlocked state of the door. The security sensor 19 detects intrusion of an outsider into a vehicle compartment through the use of supersonic waves. The siren 21 provides an audible warning that the outsider has acted improperly with respect to the vehicle. The engine controller 23 controls an engine of the vehicle. The door lock controller 27 drives and controls a door lock motor (door lock actuator) 25, which locks and unlocks the door. The mode switch 29 switches an operation mode of the smart security controller 5. The smart security controller 5 is equipped with a microcomputer 31, which administers the operation of the smart security controller 5.

The mode switch 29 is disposed at a predetermined position in the vehicle compartment (position at which the driver can operate the switch 29 from a driver's seat, for instance). The door opening detection switch 15, the door lock sensor 17 and the door lock motor 25 are mounted to each door. A vehicle battery 33 is also shown in FIG. 1.

In the present embodiment, the detection area to which the transmitter 7 transmits the transmission request signal is an area within a predetermined distance (for instance, 70 cm) from a door handle provided on an outside of a door of the driver's seat.

The transponder transmitter-receiver 11 generates an electromagnetic field for the electromagnetic induction radio communication in a predetermined area around the driver's seat in the vehicle compartment from a coil antenna 10 that is wound around a key cylinder near a vehicle steering wheel. The transponder transmitter-receiver 11 also receives a radio frequency (RF) signal, which is transmitted by a transponder 35 in the portable device 3 in response to the electromagnetic field, through the coil antenna 10. Upon receiving the RF signal, the transponder transmitter-receiver 11 outputs an identification code (immobilization code), which is included in the received RF signal and is used to certify permission of an engine start, to the smart security controller 5.

The portable device 3 includes the transponder 35, a microcomputer 37, a receiving circuit 39, a transmitting circuit 41, a locking button 43, and an unlocking button 45. The microcomputer 37 administers the functions of the portable device 3. The receiving circuit 39 includes an antenna (not shown) that receives the transmission request signal output by the transmitter 7 and inputs data, which is included in the transmission request signal, to the microcomputer 37. The transmitting circuit 41 transmits a radio signal, which includes the data output by the microcomputer 37, from a transmitting antenna (not shown). The locking button 43 is pushed to lock the door of the vehicle. The unlocking button 45 is pushed to unlock the door of the vehicle.

In the above electronic key system 1, the smart security controller 5 performs smart control (smart entry control), remote keyless entry control (RKE control), security control and immobilizer control. In the smart control, the smart security controller 5 unlocks the door when it detects existence of the portable device 3 dedicated to the specific vehicle in the above detection area. In the RKE control, the smart security controller 5 locks or unlocks the door if the user pushes the locking button 43 or the unlocking button 45 of the portable device 3. The smart security controller 5 performs the security control with the use of the security sensor 19 for the purpose of crime prevention. The immobilizer control is performed for the purpose of preventing the vehicle from being stolen.

Processing performed by the microcomputer 31 of the smart security controller 5 will be explained with reference to the flow diagram shown in FIG. 2.

Figure 2:
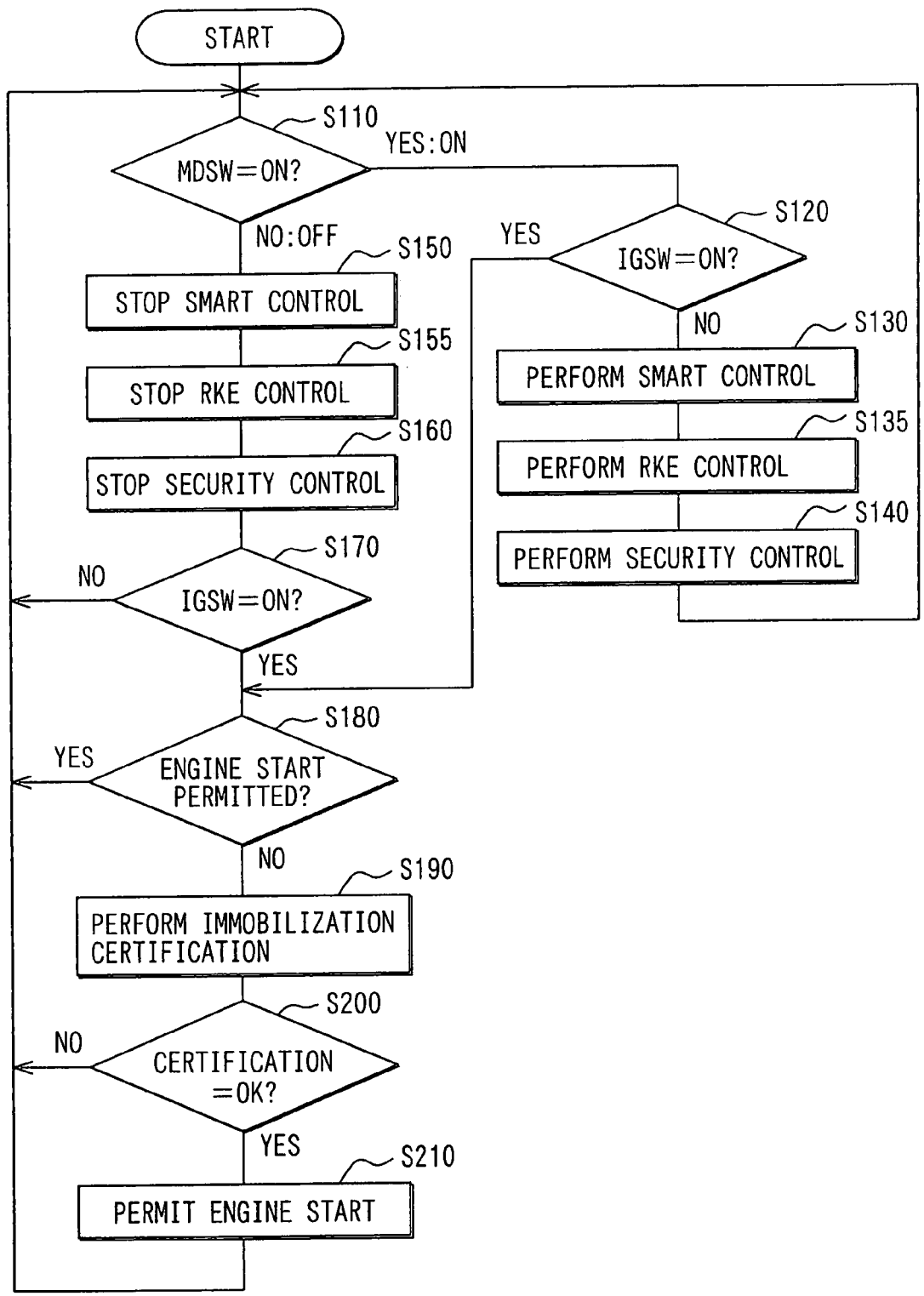
FIG. 2 is a flow diagram showing processing performed by a microcomputer of a smart security controller according to the embodiment.

As shown in FIG. 2, the microcomputer 31 of the smart security controller 5 determines whether the mode switch (MDSW) 29 is on or not at Step S110.

If the result of the determination at Step S110 is "YES," it is determined whether the ignition switch (IGSW) 13 is switched to the on position or not at Step S120. If the result of the determination at Step S120 is "NO," the processing of the smart control, the processing of the RKE control and the processing of the security control are performed at Steps S130, S135 and S140 respectively, and as will now be described in detail. The microcomputer 31 then returns to Step S110 and determines whether the mode switch 29 is switched to the on position.

The smart control of Step S130 is performed as follows.

The microcomputer 31 of the smart security controller 5 transmits the transmission request signal from the transmitter 7 at regular time intervals.

If the receiving antenna receives the transmission request signal transmitted by the transmitter 7 of the vehicle, the microcomputer 37 included in the portable device 3 provides data to the transmitting circuit 41 to transmit a return signal, which includes a smart control identification code, from the transmitting antenna.

If the receiver 9 receives the return signal from the portable device 3 when it is determined that the vehicle is in a parked state in which all doors of the vehicle are closed and locked, the microcomputer 31 of the smart security controller 5 performs vehicle compartment outside certification. In the vehicle compartment outside certification, it is determined whether the smart control identification code included in the received return signal coincides with a smart control identification code stored in the smart security controller 5 (smart control identification code specific to the vehicle in which the smart security controller 5 is installed). If the result of the vehicle compartment outside certification is "OK" (more specifically, if the smart control identification codes coincide with each other), the microcomputer 31 causes the door lock controllers 27 drive the door lock motors 25 to unlock all doors.

Thus, through the smart control, the user of the vehicle can automatically unlock the doors of the vehicle simply by carrying the proper portable device 3 and by approaching the vehicle.

The opened-closed state and the locked-unlocked state of each door of the vehicle are detected based on signals output by the door opening detection switch 15 and the door lock sensor 17 of the door. Instead of unlocking all doors immediately when it is determined that the vehicle compartment outside certification is "OK," the unlocking of the doors may be permitted when it is determined that the vehicle compartment outside certification is "OK," and then all doors may be unlocked when it is detected that a person touches a predetermined position of the vehicle (door handle adjacent to the driver's seat, for instance).

The processing of the RKE control is performed as follows.

In the portable device 3, if the microcomputer 37 included in the portable device 3 detects that the locking button 43 is pushed, the microcomputer 37 provides data to the transmitting circuit 41 to transmit a manual operation signal, which includes a locking command code, from the transmitting antenna. If the microcomputer 37 detects that the unlocking button 45 is pushed, the microcomputer 37 provides data to the transmitting circuit 41 to transmit another manual operation signal, which includes an unlocking command code, from the transmitting antenna.

If the receiver 9 receives the manual operation signal from the portable device 3, the microcomputer 31 of the smart security controller 5 determines whether the code included in the received manual operation signal coincides with a locking command code or an unlocking command code stored in the smart security controller 5 (locking command code or unlocking command code specific to the vehicle in which the smart security controller 5 is installed). If the codes coincide with each other, the microcomputer 31 causes the door lock controllers 27 to drive the door lock motors 25 in accordance with the content of the code included in the received manual operation signal. Thus, the microcomputer 31 locks or unlocks all doors. More specifically, if the code included in the received manual operation signal is the locking command code, the microcomputer 31 locks all doors. If the code included in the received manual operation signal is the unlocking command code, the microcomputer 31 unlocks all doors.

Thus, through the RKE control, the user of the vehicle can manually lock or unlock the doors by pushing the locking button 43 or the unlocking button 45 of the proper portable device 3.

The processing of the security control will be explained.

The microcomputer 31 of the smart security controller 5 determines whether a person has intruded into the vehicle compartment based on the signal from the security sensor 19 when a security setting state, in which the security function is active, occurs. If the microcomputer 31 detects the intrusion of the person into the vehicle compartment, the microcomputer 31 drives the siren 21 to provide a warning outside of the vehicle. In the present embodiment, the security setting state occurs when, for example, all of the doors are locked.

If the result of the determination at Step S120 is "YES," the microcomputer 31 of the smart security controller 5 performs the processing of the immobilizer control at Steps S180 to S210.

More specifically, first, at Step S180, it is determined whether the start of the engine has been already permitted since the ignition switch 13 is switched to the on position. If the result of the determination at Step S180 is "YES," the microcomputer 31 returns to Step S110. If the result of the determination at Step S180 is "NO," the microcomputer 31 performs immobilization certification at Step S190.

In the immobilization certification, first, the microcomputer 31 provides a command to the transponder transmitter-receiver 11 to generate an electromagnetic field, which is used for the electromagnetic induction radio communication, in a predetermined area around the driver's seat in the vehicle compartment from the coil antenna 10. If the portable device 3 is located in the area covered by the electromagnetic field, the transponder 35 in the portable device 3 transmits the RF including the immobilization code. The coil antenna 10 receives the RF. The transponder transmitter-receiver 11 inputs the immobilization code included in the RF into the microcomputer 31. The microcomputer 31 determines whether the immobilization code input from the portable device 3 coincides with the stored vehicle specific immobilization code. If the immobilization codes coincide with each other, the microcomputer 31 determines that the immobilization certification is "OK."

At Step S200, it is determined whether the immobilization certification is "OK." If the result of the determination at Step S200 is "NO," the microcomputer 31 returns to Step S110. If the result of the determination at Step S200 is "YES," the microcomputer 31 provides a command to the engine controller 23 to permit the engine start at Step S210, and returns to Step S110.

In the case where the engine start is permitted, the engine controller 23 initiates fuel injection and the ignition of the engine when the engine is cranked by operation of a starter motor to start the engine.

If the result of the determination at Step S110 is "NO," the microcomputer 31 of the smart security controller 5 deactivates the processing of the smart control, the RKE control and the security control at Steps S150, S155 and S160 respectively.

Thus, the operation mode of the smart security controller 5 is changed to a power-saving mode in which power consumption of the vehicle battery 33 is reduced compared to a normal mode. More specifically, if the processing of the smart control is deactivated, at least the power consumption for transmitting the transmission request signal from the transmitter 7 is cut. If the processing of the RKE control is deactivated, the door lock motor 25 is not driven even if the user pushes the locking button 43 or the unlocking button 45 of the portable device 3. Further, if the processing of the security control is deactivated, the siren 21 is not driven. Moreover, in the present embodiment, when the processing of the security control is deactivated, the power supply to the security sensor 19 is stopped.

The microcomputer 31 of the smart security controller 5 determines whether the ignition switch 13 is on or not at Step S170 also in the case where the processing of the smart control, the processing of the RKE control and the processing of the security control are deactivated. Then, if the result of the determination at Step S170 is "NO," the microcomputer 31 returns to Step S110. If the result of the determination at Step S170 is "YES," the processing of the immobilizer control is performed at Steps S180 to S210.

Therefore, even if the mode switch 29 is switched to the off position to bring the operation mode of the smart security controller 5 to the power-saving mode, the engine can be operated.

In the smart security controller 5 of the electronic key system 1 of the present embodiment, the operation mode is switched between the normal mode and the power-saving mode in accordance with the switching of the mode switch 29 to an on or off position. In the normal mode in which the mode switch 29 is switched to the on position (Step S110: YES), the smart control, the security control, the RKE control and the immobilizer control are activated. Among the functions of the smart control, the security control, the RKE control and the immobilizer control, only the function of the immobilizer control is activated in the power-saving mode in which the mode switch 29 is switched to the off position (S110: NO).

Therefore, in the case where the vehicle is transported or not driven a long time, the mode switch 29 may be switched to the off position and the operation mode of the smart security controller 5 is maintained in the power-saving mode. Thus, power, which would otherwise be consumed by the smart control function, the security control function and the RKE control function, can be saved, and depletion of the on-vehicle battery 33 can be prevented. Moreover, in this case, the function of the immobilizer control works as in the normal mode. As a result, the prevention of battery depletion and the need to disconnect and then re-connect the battery can be achieved at the same time.

The mode switch 29 may be provided as a dedicated switch or more generally may be any type of device or function capable of selectively activating and deactivating the smart control function, the RKE control function and the security control function. Alternatively, an existing switch or switches, such as the ignition switch 13, a door locking-unlocking switch (door handle switch) and a door opening-closing switch (courtesy switch), may be substituted as the mode switch 29. Alternatively, the mode may be switched by manipulation of the dedicated switch and manipulation of the existing switch or switches.

In the case where the existing switches are used, the mode may be switched by combining the manipulation of the existing switches. For instance, the mode may be switched when at least two switches among the above switches are manipulated in a predetermined order. If the mode can be switched by the manipulation of the existing switches, the dedicated switch is unnecessary.

Thus, in the present embodiment, the smart control, the RKE control and the security control except the immobilizer control can be selectively deactivated at the same time by switching the dedicated mode switch or other to the appropriate position or by manipulations of the dedicated or existing mode switches in the predetermined order. Therefore, there is no need to provide an individual mode switch for each control function that is to be deactivated.

In the present embodiment, the function of the RKE control is also deactivated in the power-saving mode. Alternatively, the function of the RKE control may be kept active in the power-saving mode. This is because the door lock motor 25 is operated by the function of the RKE control only when one of the buttons 43, 45 of the portable device 3 is manually pushed, so a large amount of power consumption does not occur unless either one of the buttons 43, 45 of the portable device 3 is pushed. However, the structure of the above embodiment, in which the function of the RKE control is also deactivated in the power-saving mode, can further reduce the power consumption in the power-saving mode.

The function of the RKE control may be kept active by manipulating the existing switches in a predetermined manner. For instance, by manipulating the ignition switch 13 or the door locking-unlocking switch (the door handle switch) a predetermined number of times within a predetermined period after the mode switch 29 is switched to the on position, the function of the RKE control may be activated while stopping the smart control and the security control.

In the above embodiment, the single smart security controller 5 performs the smart control, the security control, the RKE control and the immobilizer control. However, the hardware structure is not limited to that of the above embodiment. For instance, the security control may be performed by another on-vehicle controller, or controllers may be provided for each of the respective controls.

The present invention should not be limited to the disclosed embodiment, but may be implemented in many other ways without departing from the spirit of the invention.

What is claimed is:

1. An on-vehicle controller programmed to perform:
   smart control for transmitting a transmission request signal from an on-vehicle transmitter to a predetermined area and for receiving a return signal with an on-vehicle receiver to control an on-vehicle device based on the received return signal;
   security control for providing a warning if a security sensor of a vehicle detects improper conduct to the vehicle; and
   immobilizer control for reading an identification code for certifying permission for an engine start based on the read identification code to permit the engine start if the read identification code coincides with a stored identification code, wherein
   the smart control and the security control may be selectively deactivated so that only the immobilizer control remains activated to preserve vehicle battery power.

2. A method for controlling on-vehicle operations, comprising:
   transmitting a request signal to a predetermined area, and receiving a return signal to control an on-vehicle device based on the received return signal;
   providing a warning if improper conduct to a vehicle is detected;
   reading an identification code for certifying permission for an engine start to permit the engine start if the read identification code coincides with a stored identification code; and
   selectively deactivating the transmitting of the request signal, the receiving of the return signal and the providing of the warning so that only the reading of the identification code remains activated to preserve vehicle battery power.

* * * * *